[67.] No. 4,537. S. W. Collins Reissued Aug. 29, 1871.

*Process for Making Articles of Steel or Steel & Iron combined*

Witnesses.
Sarah A. Simonds
J. E. Stule

Inventors Assignee.
The Collins Company
By N. E. Simonds Atty.

AM. PHOTO-LITHOGRAPHIC CO. N.Y. OSBORNE'S PROCESS

UNITED STATES PATENT OFFICE.

THE COLLINS COMPANY, OF COLLINSVILLE, CONNECTICUT, ASSIGNEE OF SAMUEL W. COLLINS, DECEASED.

IMPROVEMENT IN CASTING EDGE AND OTHER TOOLS.

Specification forming part of Letters Patent No. 30,668, dated November 20, 1860; reissue No. 4,537, dated August 29, 1871.

DIVISION A.

*To all whom it may concern:*

Be it known that SAMUEL W. COLLINS, of Collinsville, in the county of Hartford and State of Connecticut, invented certain Improvements in the Manufacture of Edge-Tools and Implements and other articles of steel, or steel and iron combined, of which the following is a specification:

This invention consists in a new process for the manufacture of axes, adzes, hammers, anvils, and all other articles which may be cast in molds, making them partly of iron and partly of steel, or of different qualities of steel, by pouring the different metals, while in a fluid or molten state, into a mold, one after another, in immediate succession, so that while the cast article is composed of layers or stratums, so to speak, of different metals, yet these are intimately and perfectly joined together at the point or line of contact by fusion, thus dispensing either altogether or for the most part with the welding, punching, and forging or swaging or other similar processes which have heretofore been in use for the manufacture of many articles which it is practicable to produce by this process.

Figure 2:
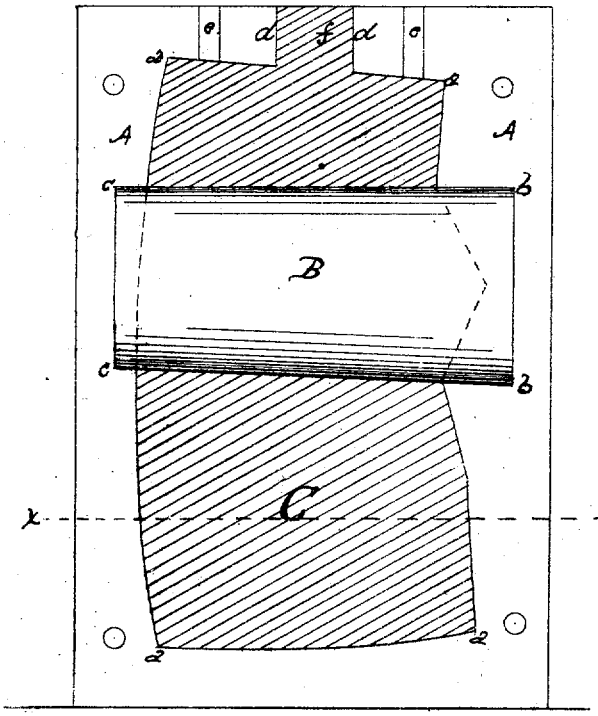
Figure 1:
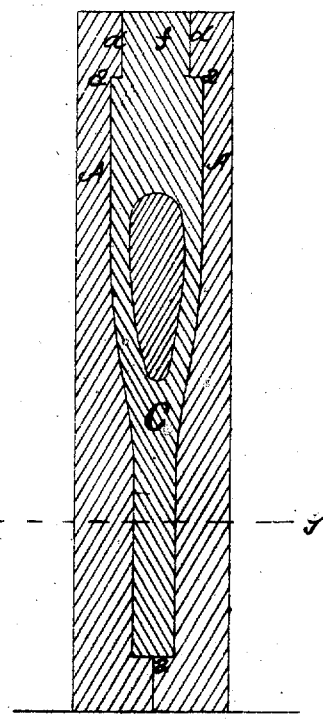

Figure 1 is a longitudinal sectional view of the mold and casting for an ax, the section being made transversely to the sides of the ax. Fig. 2 is a face view of one of the halves of the mold shown in Fig. 1, with a flatwise section of the ax corresponding thereto, and a view of the "core" which forms the eye of the ax.

Figs. 1 and 2 are designed to illustrate this invention by showing how it is applied to the making of an ax. A A indicate the halves of a mold, made either of iron or other material, each of the halves containing one-half of the cavity *a a a* in which the ax is formed, half of each of the two cavities *b b* and *c c* which hold the ends of the eye-core B, half the pouring-gate *d*, and half of each of the vent-holes *e e*. These parts of the mold are made to fit accurately together by means of the common steady-pins, and are held together when in use by the common clamps. *c* indicates the casting, and *f* the sprue.

It is preferred that the metals should be melted in crucibles, though, of course, not essential, for the sake of convenience in pouring. The different metals to be used should be brought to a state of fusion at the same time.

Before pouring, the mold must be placed in such position that that part of the mold will be lowest which it is intended to make of the metal first to be poured, so that the metal will flow to that part and stay there. The mold being in proper position, the fused metals of which it is intended to form the casting are then poured one after another in immediate succession, the pouring of each metal after the first to begin before its immediate predecessor has at all cooled, so that when the metals set they will be intimately and perfectly joined together by fusion.

In the case of the ax the lower part or edge would be formed of steel, which would rise, say as high as the line *x y*, after which the pouring to form the remainder of the ax would go on.

Hammers and other implements and articles may be made with steel faces and iron bodies by this process, and generally articles of all kinds can be made of different layers or stratums, so to speak, of iron and steel. This is specially valuable in making many tools which have points, edges or faces; the faces, edges, or points can be made of steel and the body of iron, or of a lower quality of steel.

In making anvils and many other articles it is generally desirable to have only the face made of steel while the body is made of iron.

Figs. 1 and 2 are meant for showing the shape of the casting for an ax when the ax is made of different qualities of steel. The lower part where the edge will afterward be is left very broad and blunt, so that it may be afterward drawn, hammered, rolled, or in other similar manner wrought down to the finished shape. The whole ax being of steel, it can be forged and wrought as desired, which would not be the case if the body of the ax were of common cast-iron, from which it follows that when the body of the article is to be of common cast-iron, the shape of the casting should closely conform to the shape of the finished article, so that it can be completed or finished without forging or similar manipulation.

In short, this process is applicable to the production of all articles, for whatever purpose designed, which are capable of being made of cast metal.

In division B of these reissued Letters Patent I have claimed as my invention the process of making edged, faced, or similar tools with an edge, face, or similar part of steel, by first casting a blank of steel, or of steel and iron combined, the body of which closely conforms to the shape of the finished article, but with the part which is to form the edge, face, or similar part blunt and thick, and afterward, by hammering or other similar manipulation, working such blunt and thick part into the shape of the completed article, substantially in the manner and for the purpose set forth in the specification of said division B. I do not claim as my invention in this division of these reissued Letters Patent the process set forth and claimed in said division B.

Applicant claims as this invention—

The process of casting any article partly of iron and parly of steel, or of different qualities of steel, by pouring into a mold, in a melted state, these metals one after another in immediate succession, thereby effecting a union between them by fusion, substantially in the manner and for the purpose set forth.

THE COLLINS COMPANY,
By W. I. WOOD,
*Vice-President and Chief Executive Officer.*

Witnesses:
OLIVER F. PERRY,
ALBERT L. THAYER,
J. H. BIDWELL.

(67.)